Dec. 15, 1953 P. R. HIRSH 2,662,555
PIPE AND METHOD FOR MAKING THE SAME
Filed Dec. 3, 1948
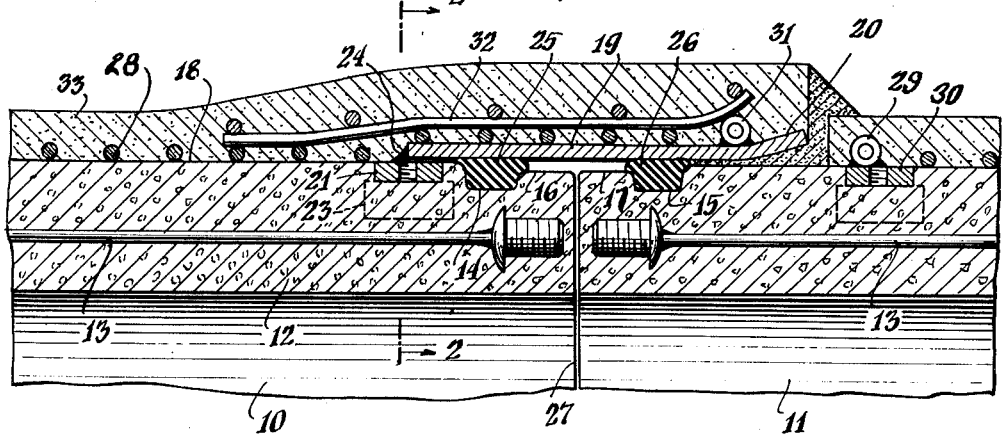
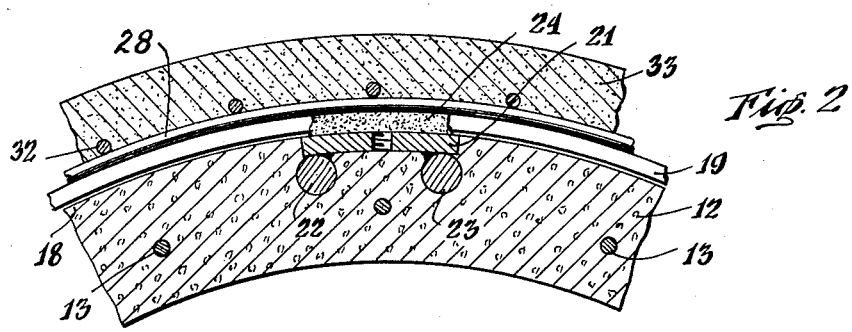
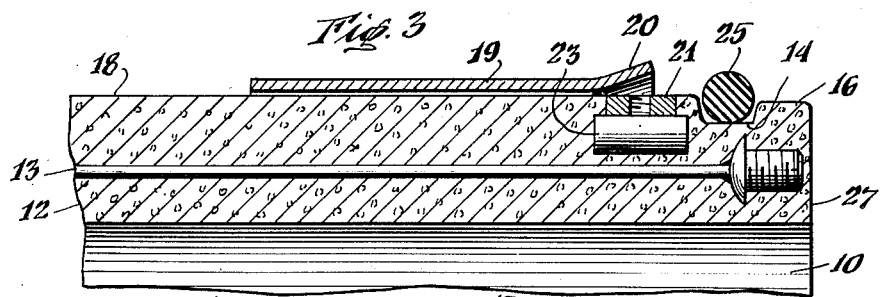
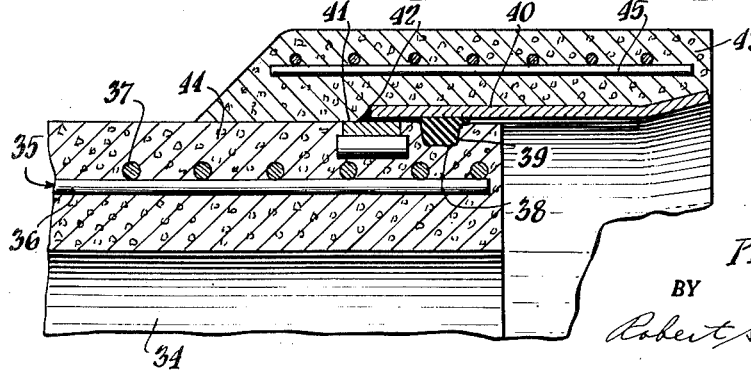
INVENTOR.
Philip R. Hirsh
BY
Robert S. Dunham
ATTORNEY Patented Dec. 15, 1953

2,662,555

UNITED STATES PATENT OFFICE 2,662,555

PIPE AND METHOD FOR MAKING THE SAME

Philip R. Hirsh, Montclair, N. J., assignor to Lock Joint Pipe Company, East Orange, N. J., a corporation of New Jersey Application December 3, 1948, Serial No. 63,322

3 Claims. (Cl. 138—84)

1

This invention relates to concrete pipes having bell and spigot joining ends.

Among the objects of the invention is to effect economies in the construction of reinforced concrete pipe of the bell and spigot variety by enabling the completion of the manufacture of the conduit portion of the pipe and the subsequent application of the socket member to provide a bell for the pipe.

An object of the invention is to provide a concrete pipe or pipe section having complementary joining ends with one of the ends having a metallic socket member secured thereto and confining a gasket in a groove in the pipe section, said metallic socket member extending beyond the end of the pipe to form a bell for engaging a complementary end of another pipe section.

Another object of the invention is to provide a method by which a steel socket member is attached to one end of a straight-walled concrete conduit and is sealed with respect thereto by a gasket confined between the socket member and the conduit.

Other objects and advantages of the present invention are contained in the following description and claims and are illustrated in the accompanying drawings which show preferred embodiments of the principle of the invention and the best mode of applying the same.

In the drawings,

Fig. 1 is a partial view of the longitudinal section taken through joined pipe sections;

Fig. 2 is a section on line 2—2 of Fig. 1;

Fig. 3 illustrates a position of the sleeve of a socket member before it is attached to a conduit portion of a pipe section; and Fig. 4 is a partial view of a longitudinal section of a modified form of pipe.

The conduit portion of the pipe section may be moulded or cast in any well-known manner, and it is an advantage of the present invention that the conduit portion may be moulded in parallel inside and outside moulds or within a cylindrical drum of the type which is employed in centrifuging machines. The invention enables the use of a simple form of mould because the conduit of the pipe section is straight-walled, that is to say, it has a uniform wall thickness throughout its length. Consequently, the conduit is of uniform strength.

In Fig. 1 there is shown complementary ends of two pipe sections 10 and 11, and it will be understood that each of the pipe sections is provided with a complementary spigot or bell, as the case may be, at its other end. The concrete conduit portion 12 of each pipe section is formed in a suitable mould by which internal reinforcement may be supported, such as the steel rods 13. Except for the gasket-containing circumferential grooves 14 and 15, one at each end of a conduit 12, and the reduced diameters 16 and 17 at the ends of the conduit, the outer surface 18 is of constant diameter.

The steel sleeve 19 preferably has a sloping portion 20 at one end, and its inner diameter is such as to fit over the outer cylindrical surface 18 of the conduit 12. The metallic sleeve 19 is attached to the conduit by means of inserts comprising three or more anchoring plates 21, to each of which a pair of blocks 22 and 23 are attached. The anchoring plates 21 are secured to the interior of the outer mould in which the conduit portion of the pipe section is formed, whereby they are equi-distantly spaced circumferentially of the pipe section and at a predetermined distance from its bell end. The blocks 22 and 23 serve to permanently anchor the plates within the moulded concrete.

The metallic sleeve 19 is secured in place by means of welds 24 by which the sleeve is permanently fastened to the anchor plates 21. Leakage is prevented between the sleeve 19 and the concrete conduit of the pipe section by a gasket 25 which is confined by the sleeve in the groove 14 at the bell end of the conduit. The gasket 25 may consist of a ring of rubber, synthetic rubber, plastic, or of any other deformable material suitable for providing an efficient seal when forcibly confined between the conduit and the sleeve. The sleeve extends forwardly of the gasket and beyond the end of the concrete conduit to provide a joint socket adapted to engage a complementary spigot of another pipe section 11, as illustrated in Fig. 1. When a joint is closed, it is sealed by a gasket 26. The gasket 26 is confined in the groove 15 of the spigot of a connected pipe section by the sleeve 19 which constitutes the socket member or bell.

The sleeve 19 is applied after the concrete conduit has been removed from the mould. The gasket 25 may be inserted in its groove 14 and the sleeve 19 advanced over it to its ultimate position in which it is permanently attached to the conduit, or the sleeve may first be fitted over the conduit, as illustrated in Fig. 3, and then moved forwardly and over the gasket until it reaches its ultimate position of attachment. In moving the sleeve rearwardly after the gasket is mounted in its groove, a pilot ring having a guiding surface may be employed in advance of the rear edge of the sleeve to force the gasket into its groove and under the inner surface of the sleeve, but if the sleeve is mounted over the conduit before the gasket is placed in its groove, the sloping portion 20 of the sleeve will serve gradually to compress and confine the gasket within the sleeve and groove 14 as it is moved into place. Regardless of the order of placing the sleeve 19 and the gasket over the end of the conduit, the final position of the sleeve is such that its rearward edge may be welded to the several anchoring plates 21 with its forward edge extending the desired distance beyond the end 27 of the conduit to provide the bell of the pipe as shown in Fig. 1.

In making a high pressure type of pipe the pipe section is encircled by a helical wrapping of steel wire 28. One end of the wire is secured to the conduit by an anchoring sleeve 29 which is welded to a steel anchoring plate 30 located adjacent to the spigot. The wire is wrapped around the conduit and over the steel sleeve 19 to which it is secured by an anchoring sleeve 31. The anchoring sleeve 31 is welded to the exterior of the sleeve 19. Inasmuch as the exterior surface of the sleeve 19 is located only a little more than the thickness of the sleeve from the exterior of the concrete conduit portion, this construction lends itself to wrapping with a continuous wire without any complications. As the wire is applied and is maintained under constant tension, substantially the full length of the pipe section from the spigot shoulder to the forward end of the bell of the pipe is uniformly compressed. A wire mesh 32 is preferably applied around the sleeve 19. This wire mesh extends rearwardly of the sleeve and over the concrete wall of the pipe section. The tensioned wire wrapping 28 and the wire mesh 32 are covered with a protective coating of mortar 33.

The moulded conduit 44 of the pipe section 34 illustrated in Fig. 4 is provided with a steel cage 35 constituting longitudinal bars 36 circumferentially spaced from one another, and reinforcing rings 37. The wire cage is supported in the mould and embedded within the concrete of the conduit portion of the pipe section. The conduit portion 44 is provided with a circumferential groove 38 for containing a gasket 39 at the bell end of the pipe and a similar circumferential groove for containing a gasket at the spigot end of the pipe. The steel sleeve 40 is applied as hereinabove described and is secured to anchoring plates 41 by means of welds 42. The sleeve 40 is reinforced on its exterior by a concrete collar 43 which is moulded in place over the sleeve and also over the concrete wall 44 of the pipe section rearwardly of the sleeve. The collar 43 has embedded therein a wire reinforcing mesh 45.

The principle involved in the construction of the pipes described makes it possible to produce concrete pipes economically because the tube-like construction of their moulded conduit portions can be produced in a simple form of centrifugal mould as compared with the more complex and costly moulds that are required for moulding a pipe having a conduit portion and bell moulded in one piece.

What is claimed is:

1. A bell-ended pipe section comprising a tubular integral mass of hardened concrete in the form of a conduit, a rigid sleeve of metal disposed outside of said conduit adjacent one of its ends and extending beyond said end to provide a bell for said pipe section, the portion of said sleeve overlapping said conduit having an inner diameter slightly greater than the diameter of the underlying outer surface of said conduit thereby leaving a substantially uniform clearance between the sleeve and the conduit, means permanently attaching said sleeve to said conduit, said attaching means comprising an inset of metal and a positive connection fast to said sleeve and to said inset, said inset being immovably contained in the concrete of said conduit and exposed at the outer surface of said conduit locally of the rear edge of said sleeve, and an annular gasket disposed in a circumferential groove in the outer surface of said conduit intermediate said attaching means and said end of said conduit whereby said clearance is sealed to prevent flow of fluid from within the bell to the rear edge of said sleeve.

2. A bell-ended pipe section comprising a tubular integral mass of hardened concrete in the form of a conduit, said conduit carrying a plurality of anchors separated from one another circumferentially around said conduit and wholly contained in the concrete of said conduit except for portions exposed through the outer surface of the concrete on a circle displaced from one end of said conduit, a rigid sleeve oversized with respect to the outside of said conduit and disposed in overlapping relationship to the said conduit, said sleeve having a cylindrical portion closely overlying the outer surface of said conduit from said exposed portions of said anchors to said end of said conduit and extending forwardly beyond said end to provide a bell for said pipe section, an annular gasket disposed in a circumferential groove in the outer surface of said conduit intermediate the edge of the cylindrical portion of said sleeve and said end of said conduit for sealing against the flow of fluid between the sleeve and the outer surface of the conduit, and means attaching said sleeve to said anchors whereby said sleeve is held fast to said conduit.

3. In a method for making a bell-ended pipe section, the steps comprising moulding a concrete conduit with metal insets arranged in a circle in the wall of the conduit adjacent one end of the conduit and partially exposed at the outer surface of the conduit and with a circumferential groove in the outer surface of said conduit between said circle of insets and said end, then after the concrete has hardened placing a steel sleeve in overlapping relationship therewith in a position extending from said circle of insets to beyond the end of said conduit and at the same time confining a gasket disposed in said circumferential groove, and welding said sleeve to said insets.

PHILIP R. HIRSH.

References Cited in the file of this patent

UNITED STATES PATENTS

| Number | Name | Date |
|---|---|---|
| 1,973,967 | Ukropina | Sept. 18, 1934 |
| 2,234,643 | Grant | Mar. 11, 1941 |
| 2,470,818 | Hirsh | May 24, 1949 |

FOREIGN PATENTS

| Number | Country | Date |
|---|---|---|
| 851,299 | France | Jan. 5, 1940 |